(12) United States Patent
Liu

(10) Patent No.: US 9,168,607 B2
(45) Date of Patent: Oct. 27, 2015

(54) ARC IGNITION DEVICE

(75) Inventor: Yingchun Liu, Dongguan (CN)

(73) Assignee: Donggen Zhou, Dongguan, Guangdong (CN)

( * ) Notice: Subject to any disclaimer, the term of this patent is extended or adjusted under 35 U.S.C. 154(b) by 168 days.

(21) Appl. No.: 13/982,221

(22) PCT Filed: Jan. 30, 2012

(86) PCT No.: PCT/CN2012/070774
§ 371 (c)(1),
(2), (4) Date: Jul. 26, 2013

(87) PCT Pub. No.: WO2012/103798
PCT Pub. Date: Aug. 9, 2012

(65) Prior Publication Data
US 2013/0306606 A1  Nov. 21, 2013

(30) Foreign Application Priority Data

Jan. 31, 2011 (CN) .......................... 2011 1 0033631

(51) Int. Cl.
*B23K 10/00* (2006.01)
*B23K 9/067* (2006.01)
*B23K 10/02* (2006.01)
*H05H 1/52* (2006.01)
*H05H 1/34* (2006.01)

(52) U.S. Cl.
CPC ............... *B23K 9/0677* (2013.01); *B23K 9/067* (2013.01); *B23K 10/00* (2013.01); *B23K 10/02* (2013.01); *H05H 1/52* (2013.01); *H05H 2001/3489* (2013.01)

(58) Field of Classification Search
CPC ............. H05H 1/52; H05H 1/34; H05H 1/36; H05H 2001/3489; B23K 10/00; B23K 9/0677
USPC .................... 219/121.54, 121.57, 121.48, 75, 219/121.52; 313/231.41; 315/111.21
See application file for complete search history.

(56) References Cited

U.S. PATENT DOCUMENTS

| 5,208,441 A * | 5/1993 | Broberg ................... 219/121.52 |
| 5,925,267 A * | 7/1999 | Kitahashi ................. 219/121.57 |
| 7,518,085 B1 * | 4/2009 | Krishnan ................. 219/121.52 |
| 7,937,945 B2 * | 5/2011 | Kinde, Sr. ........................ 60/767 |

* cited by examiner

*Primary Examiner* — Mark Paschall
(74) *Attorney, Agent, or Firm* — Shimokaji IP

(57) ABSTRACT

An arc ignition device of a plasma welding gun includes an igniter and a fixture. The igniter includes an arc ignition block (5), a spring (6) and a tungsten needle (3), and the fixture includes a fastening member (4), a tungsten needle clamp (7), a base (2) and a magnet (1). The arc ignition block and the tungsten needle are conductors. And the tungsten needle is clamped by the fixture with the fastening member cooperated with an arc surface of the tungsten needle clamp. Additionally, the magnet is embedded in the base, by means of which the arc ignition device can be attached to any position. Through the precise relative motion of the spring, the arc ignition device implements a high-requirement arc ignition function.

7 Claims, 2 Drawing Sheets

ARC IGNITION DEVICE

This application claims the benefit of Chinese patent application No 201110033631.X, filed Jan. 31, 2011, with a title of "ARC IGNITION DEVICE", which is incorporated herein by reference in its entirety.

FIELD OF THE INVENTION

The present invention relates to an arc ignition device of a plasma welding gun, which is applicable to any welding gun of plasma welding machines.

BACKGROUND OF THE INVENTION

Generally, in plasma welding machines, as a plasma welding gun is provided with an arc ignition device therein, thus the plasma welding has an oversize bulk which is not applicable to use in a small space and, in turns reduce its usage in the plasma welding field. The present invention aims at developing an individual arc ignition device which is cooperated with the plasma welding gun, so as to broaden the usage of the plasma welding machine in the welding field, by which a new energy revolution will be achieved in the plasma welding field.

SUMMARY OF THE INVENTION

Accordingly, an aspect of the present invention is to solve a problem referring to arc ignition of a plasma welding gun. A nozzle is provided at the front of the plasma welding gun, whose outside is connected with anode, and a cathode terminal insulated to the outside is embedded in the nozzle to contact with cathode. The present invention provides an arc ignition device including an igniter and a fixture, the igniter includes an arc ignition block 5, a spring 6 and a tungsten needle 3, and the arc ignition block and the tungsten needle are conductors and have relative motions. The arc ignition block is provided with an inner arc surface, the spring is set under the arc ignition block, and the arc ignition block is movable up and down along an outer surface of the tungsten needle by means of the spring. The fixture includes a fastening member 4, a tungsten needle clamp 7, a base 2 and a magnet 1. The fastening member is provided with an inner arc surface which is cooperated with an outer arc surface of the tungsten needle, and the fastening member is fastened to the base to urge and fix tungsten needle. Moreover, multiple clamping jaws are provided on a top of the tungsten needle clamp, which can be opened or closed, and the magnet is embedded in the base, by means of which the base could be attached to any position of an iron work table.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Further description and embodiments of the invention will now be described with reference to the figures.

Figure 1:
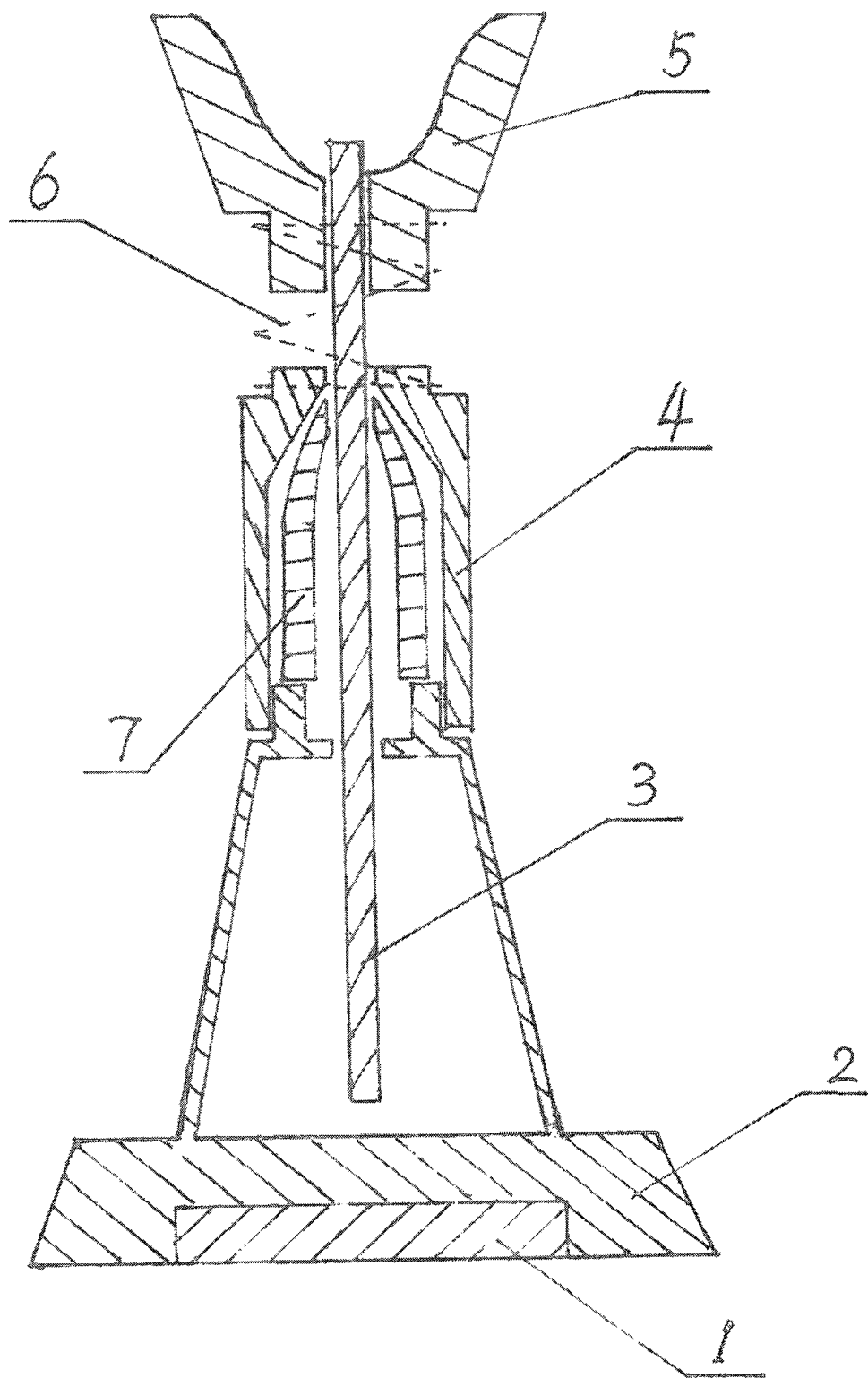
FIG. 1 is a cross-sectional view of an arc ignition device of the present invention.
Figure 2:
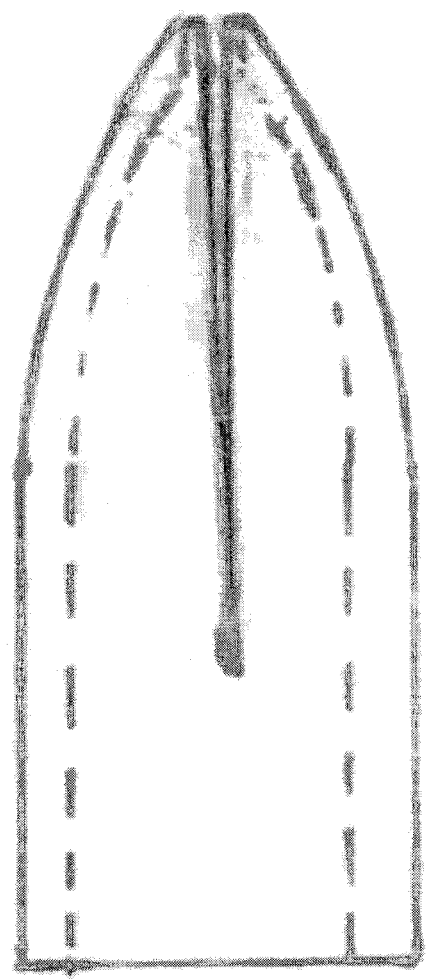
FIG. 2 is an outline of a tungsten needle clamp of the igniter.

Referring to FIGS. 1 and 2, when the arc ignition block 5 is pressured by the nozzle of the welding gun of the plasma welding machine, due to the inner arc surface of the arc ignition block 5 is similar to the outer surface of the nozzle, thus the center of the nozzle is aligned with the center of the arc ignition block 5, and the spring 6 is pressured downward, then the arc ignition block 5 slides downward. At the same time, the tungsten needle 3 is inserted into the nozzle to contact the cathode terminal therein. In this condition, short circuit happens due to both of the arc ignition block 5 and the tungsten needle 3 is conductive, to ignite an arc thereby achieving arc ignition function. Thereafter, the welding gun is loosened, and then the arc ignition block 5 is raised by means of resilience of the spring 6. When the tungsten needle 3 is damaged after repeated ignition, the tungsten needle 3 can be moved upward at a suitable position after loosening the fastening member 4, then screw the fastening member 4 to the base 2, so that the tungsten needle clamp 7 is urged upward by the base 2. And the tungsten needle 3 is clamped firmly by the clamping jaws of the tungsten needle clamp 7 with the cooperation of the inner arc surface of the base 2, to fix the tungsten needle 3. In addition, the base 2 can be attached to any desired position of the iron work table by means of the magnet 1 connected with the base 2.

What is claimed is:

1. An arc ignition device, comprising an igniter and a fixture, the igniter comprising an arc ignition block, a spring and a tungsten needle, wherein the tungsten needle and the arc ignition block are electrical conductors, the arc ignition block is movable up and down along an outer surface of the tungsten needle by means of the spring, and the tungsten needle is contacted with a cathode terminal of a nozzle of a welding gun when the arc ignition block is moved downward to ignite an arc.

2. The arc ignition device according to claim 1, wherein the fixture comprises a tungsten needle clamp, a fastening member, a base supporting the tungsten needle clamp and the fastening member, and a magnet connected with the base, and the tungsten needle is clamped by the tungsten needle clamp and the fastening member.

3. The arc ignition device according to claim 1, wherein the arc ignition block is provided with an inner arc surface.

4. The arc ignition device according to claim 1, wherein the spring is provided under the arc ignition block.

5. The arc ignition device according to claim 2, wherein the fastening member is provided with an inner arc surface which is cooperated with an outer arc surface of the tungsten needle, and the fastening member is fastened to the base to urge and fix tungsten needle.

6. The arc ignition device according to claim 2, wherein multiple adjustable clamping jaws are provided on a top of the tungsten needle clamp.

7. The arc ignition device according to claim 2, wherein the magnet is embedded in the bottom of the base, by means of which the base could be attached to any position of an iron work table.

* * * * *